United States Patent
Udagawa et al.

(10) Patent No.: US 7,125,111 B2
(45) Date of Patent: Oct. 24, 2006

(54) INK AND INK JET RECORDING METHOD USING THE INK

(75) Inventors: Masako Udagawa, Kanagawa (JP); Akira Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/968,986

(22) Filed: Oct. 21, 2004

(65) Prior Publication Data

US 2005/0052515 A1  Mar. 10, 2005

Related U.S. Application Data

(63) Continuation of application No. PCT/JP03/08106, filed on Jun. 26, 2003.

(30) Foreign Application Priority Data

May 2, 2003  (JP) ............................. 2003-127614

(51) Int. Cl.
   *B41J 2/01* (2006.01)
(52) U.S. Cl. ...................... 347/100; 347/95; 106/31.13
(58) Field of Classification Search ................ 347/100, 347/96, 95, 101; 523/160; 106/31.13, 31.27, 106/31.6

See application file for complete search history.

(56) References Cited

U.S. PATENT DOCUMENTS

| 5,078,790 A | 1/1992 | Tochihara et al. ............. 106/20 |
| 5,080,716 A | 1/1992 | Aoki et al. ..................... 106/20 |
| 5,131,949 A | 7/1992 | Tochihara et al. ............. 106/20 |
| 5,132,700 A | 7/1992 | Tochihara et al. ............. 346/1.1 |
| 5,213,613 A | 5/1993 | Nagashima et al. ........... 106/20 |
| 5,258,066 A | 11/1993 | Kobayashi et al. ............ 106/22 |
| 5,296,022 A | 3/1994 | Kobayashi et al. ............ 106/20 |
| 5,356,464 A * | 10/1994 | Hickman et al. ............ 347/100 |
| 5,409,529 A | 4/1995 | Nagashima et al. ........... 106/22 |
| 5,451,251 A | 9/1995 | Mafune et al. ................. 106/22 |
| 5,478,383 A | 12/1995 | Nagashima et al. ........... 106/22 |
| 5,482,545 A | 1/1996 | Aoki et al. ..................... 106/22 |
| 5,531,818 A * | 7/1996 | Lin et al. ..................... 347/100 |
| 5,571,313 A | 11/1996 | Mafune et al. ................. 106/22 |
| 5,693,129 A * | 12/1997 | Lin ............................. 347/100 |
| 5,733,363 A | 3/1998 | Nagashima et al. ..... 106/31.43 |
| 5,865,883 A | 2/1999 | Teraoka et al. .......... 106/31.32 |
| 5,868,822 A * | 2/1999 | Yui et al. .................... 347/100 |
| 5,883,157 A * | 3/1999 | Yamashita et al. .......... 523/161 |
| 5,936,649 A | 8/1999 | Ikeda et al. .................. 347/87 |
| 6,676,254 B1 | 1/2004 | Nagashima et al. ........ 347/100 |
| 2004/0027404 A1 | 2/2004 | Nagashima et al. ............ 347/8 |
| 2004/0231554 A1 | 11/2004 | Udagawa et al. ........ 106/31.15 |

FOREIGN PATENT DOCUMENTS

| DE | 698 02 117 | 3/2002 |
| EP | 0 853 107 | 7/1998 |
| JP | 61-59911 B2 | 12/1986 |
| JP | 61-59912 B2 | 12/1986 |

(Continued)

*Primary Examiner*—Manish S. Shah
(74) *Attorney, Agent, or Firm*—Fitzpatrick, Cella, Harper & Scinto

(57) ABSTRACT

Provided are an ink for ink jet recording and an ink jet recording method. The ink for ink jet recording includes an aqueous liquid medium, water-dispersible coloring material, and hardly water-soluble dye having no azo group, the ink jet recording being carried out by ejecting the ink by applying thermal energy thereto, whereby high durability can be achieved.

15 Claims, 3 Drawing Sheets

FOREIGN PATENT DOCUMENTS

| | | |
|---|---|---|
| JP | 61-59914 B2 | 12/1986 |
| JP | 8-253717 A | 1/1996 |
| JP | 9-111164 A | 4/1997 |
| JP | 9-157564 A | 6/1997 |
| JP | 10-204348 A | 8/1998 |
| JP | 2002-285053 A | 10/2002 |

* cited by examiner

INK AND INK JET RECORDING METHOD USING THE INK

This application is a continuation of International Application No. PCT/JP03/08106 filed Jun. 26, 2003.

BACKGROUND OF THE INVENTION

1. Field of the Invention

The present invention relates to an aqueous ink for ink jet recording which is suitable for use in an ink jet recording apparatus, particularly an ink jet recording apparatus of a bubble jet system, and which provides ejection stability and high head durability, and to an ink jet recording method using the ink.

2. Related Background Art

The ink jet recording method carries out recording by ejecting ink droplets to attach them onto a recording medium such as paper. Specifically, an ink jet recording method disclosed in JP-B-S61-59911, JP-B-S61-59912, and JP-B-S61-59914, i.e., a bubble jet recording method uses an electrothermal converter as ejection energy supply means to give thermal energy to an ink in order to generate a bubble in the ink, which bubble pushes out an ink droplet. This bubble ink jet method allows a recording head to have multiple orifices at a high density, enabling recording of a high-resolution and high-definition image at a high speed.

In the above bubble jet recording method, as the temperature of a heater provided in a nozzle is instantaneously raised to 300° C. or higher (to be said as 360° C.), ink components or thermally decomposed product thereof and impurities (hereinafter referred to as "koga") may deposit on the surface of the heater. Since such deposit impairs heat conduction from the heater to the ink, foaming in the ink may not occur properly, resulting in printing defect. The deposition of a substance derived from the ink components on the surface of the heater is called "kogation" and is an obstruction to the improvement of the durability of a bubble jet type ejection head.

Since above koga is mainly derived from organic substances, kogation may occur in both dye ink and pigment ink. Various studies have been previously made to improve this phenomenon. In particular, in an ink including a water-dispersible pigment, koga tend to be produced in large quantities to deposit on the heater, or durability of the head tends to deteriorate. Meanwhile, as low running cost is desired for an ink jet recording apparatus more and more, a head having higher durability is demanded.

SUMMARY OF THE INVENTION

Conventionally, additives are added to the ink to remove the deposit on the heater in the bubble jet system. Additives such as ethylene oxide-based surfactant added to a pigment ink can partially remove the deposit. According to the study by the present inventors, however, deposition on the heater and the removal action do not always occur constantly, and the amount of the deposit on the heater cannot be controlled in some cases. When an additive such as a chelating agent is added to remove the surface of the protective layer of the heater so as to prevent deposition on the heater, the protective layer becomes thin. Thus, sometimes the protective layer cracks to damage thermal energy generation, making ejection impossible.

To cope with this problem, the inventors thought it was necessary to study the mechanism of kogation from a different point of view. In an ink containing a pigment a water-dispersible coloring material, especially, the dispersibility of the pigment is demolished by bubble formation, and destructed dispersion deposits on the heater as koga. Therefore, the ink properties may not be expressed in long-time use. Further, as the electric pulse is repeatedly applied for heating the heater during use of the ink jet recording head, koga, derived from the water-dispersible coloring material in the ink, accumulates on the surface of the heater, thereby causing an ink ejection failure.

It is therefore an object of the present invention to provide an ink for ink jet recording capable of achieving high durability of the heater not attained by the prior art, particularly an ink for ink jet recording suitable for the bubble jet recording, and an ink jet recording method which can attain high durability of the heater using the ink.

The inventors of the present invention have conducted studies on novel additives for improving the durability of a heater without causing deposition of koga such as the decomposed product on the heater and without thinning the protective layer of the heater, and found out that a certain dye structure was effective. The inventors of the present invention paid attention to the absence of azo bond as one of the features of the dye structure and further to the behavior of the coloring material upon formation and disappearance of a bubble in the ink. As a result, the inventors of the present invention found out that when a hardly water-soluble dye having no azo bond (hereinafter referred to as non azo dye) was added to an ink containing a water-dispersible coloring material to observe the heater after a durability test, the deposition of the decomposed product on the heater did not occur, the protective layer of the heater was not thinned, and that the durability of the heater was able to be further improved. The present invention has been accomplished based on these findings.

Therefore, according to the present invention, there is provided an ink for ink jet recording characterized by including: an aqueous liquid medium; a water-dispersible coloring material; and a hardly water-soluble dye having no azo group.

Furthermore, according to the present invention, there is provided an ink jet recording method including: ejecting an ink from an ejection port; the ink being the above-mentioned ink; and adhering the ink to a recording medium to carry out recording.

DETAILED DESCRIPTION OF THE INVENTION

Figure 1:
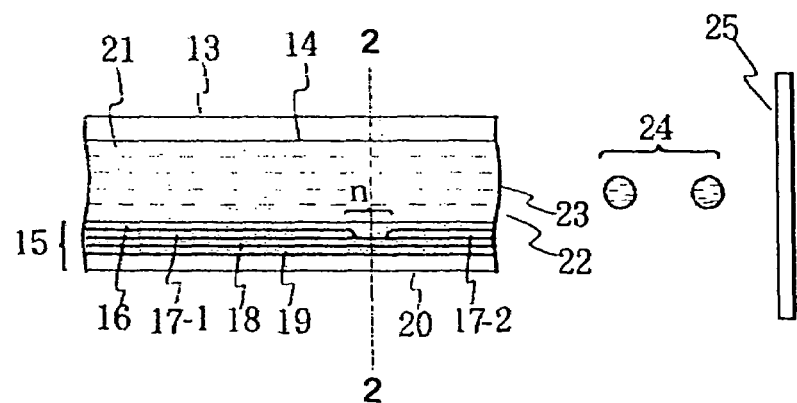
FIG. 1 is a longitudinal sectional view of an example of a head of an ink jet recording apparatus.

Preferred embodiments of the present invention will be described in detail hereinbelow. Deposition of decomposition products of a water-dispersible coloring material on a heater is able to be prevented and the durability of the heater is able to be improved by incorporating at least one kind of hardly water-soluble dye which has no azo group (hereinafter referred to as non-azo dye) in an ink for ink jet recording of the present invention.

The reason why the ink jet ink and ink jet recording method of the present invention can improve the durability of the heater is considered as follows: during inflation and deflation of a bubble in the ink, the above hardly water-soluble coloring material, because of its low solubility in water, tends to align at the interface between the ink and a bubble that is generated in the ink above the heater by the thermal energy provided by the electrothermal converter device (heater). Since the interface between the ink and the bubble inflates and deflates very rapidly, most of the hardly water-soluble coloring material instantaneously align along the changing interface to form, on the surface of the heater, a film-like body composed of a large number of layers of hardly water-soluble coloring material molecules. Judging from the result of ejection performance, this film is extremely thin and does not affect heat conduction from the heater to the ink. This film-like body is actually an accumulation of molecules of hardly water-soluble coloring material aligned with space between them. Therefore, when the bubble in the ink disappears, the film not decomposed with heat dissolves in a solvent component of the ink and disappears. In a system where the above hardly water-soluble dye is present, koga hardly deposits on the surface of the heater owing to the presence of this film. As a result, even when the head is used for a long time and the cumulative number of electric pulse increases, the amount of deposit is extremely small. The protective layer of the heater is hardly thinned by virtue of a thin film formed from this material on the heater. Since the hardly water-soluble dye used in the present invention has no azo group, there is no nitrogen bond decomposed by the thermal energy from the heater. In general, a dye having no azo group is small in number of bonds subject to thermal decomposition, so that the dye hardly generates decomposition products which may cause kogation. We infer that the durability of the heater is improved by virtue of the synergistic effect of the above two functions of using the hardly water-soluble non-azo dye for forming a film on the surface of the heater. In particular, in order to form a film from the above hardly water-soluble coloring material more efficiently, it is preferable that the ink of the present invention contains a solvent that is soluble in water but has a property of orienting toward the interface and can dissolve the above hardly water-soluble coloring material more than water can.

Examples of the water-dispersible coloring material which can be used in the present invention include pigments and dispersible dyes, and pigments are particularly preferable. Any pigment can be used provided that the pigment is compatible with the above performance, but carbon black is preferred as a pigment for a black pigment ink. For example, a carbon black pigment such as furnace black, lamp black, acetylene black, or channel black may be used. Examples of the carbon black pigment include: commercially available products such as: Raven 7000, Raven 5750, Raven 5250, Raven 5000 ULTRA-, Raven 3500, Raven 2000, Raven 1500, Raven 1250, Raven 1200, Raven 1190 ULTRA-II, Raven 1170, and RAVEN 1255 (manufactured by Columbian Chemicals Company); Black Pearls, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan XC-72R (manufactured by Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (manufactured by Degussa-Huls AG); and No. 25, No. 33, No. 40, No. 47, No. 52, No. 900, No. 2300, MCF-88, MA600, MA7, MA8, and MA100 (manufactured by Mitsubishi Chemical Corporation); and other newly prepared products.

Specific examples of the organic pigment include: insoluble azo pigments such as Toluidine Red, Toluidine Maroon, Hansa Yellow, Benzidine Yellow, and Pyrazolone Red; soluble azo pigments such as Lithol Red, Helio Bordeaux, Pigment Scarlet, and Permanent Red 2B; derivatives from vat dyes such as alizarin, indanthrone, and thioindigo maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange, and Benzimidazolone Red; pyranthrone pigments such as Pyranthrone Red and Pyranthrone Orange; thioindigo pigments; condensed azo pigments; diketopyrrolopyrrole pigments; and other pigments including: Flavanthrone Yellow; Acylamide Yellow; Quinophtharone Yellow; Nickel Azo Yellow; Copper Azomethine Yellow; Perynone Orange; Anthrone Orange; Dianthraquinonyl Red; and Dioxazine Violet.

Further, examples of the organic pigment (represented by color index (C.I.) numbers) include: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

The solid content of the water-dispersible coloring material based on 100 parts by mass of the ink of the present invention is preferably 0.5 to 10 parts by mass, more preferably 1 to 5 parts by mass. When the solid content is 0.5 parts by mass or more, a satisfactory image density is obtained and when the solid content is not higher than 10 parts by mass, the viscosity of a recording liquid is not so high that it can be ejected from the nozzle stably.

The pigment used in the present invention may be a self-dispersible pigment having at least one hydrophilic group on the surface of the pigment directly or through another atomic group, or a dispersible pigment which includes a dispersant such as a resin or surfactant to disperse in water. The effect of the present invention can be obtained particularly with a dispersant dispersible pigment.

Those two different types of pigments may be used alone or as a mixture of two or more.

Any dispersant may be used optionally in the present invention, if necessary, as long as the dispersant is a water-soluble resin. Examples of the dispersant include: a block copolymer, random copolymer, and graft copolymer made of at least two monomers (at least one of them is a hydrophilic monomer) selected from the group consisting of styrene, styrene derivatives, vinyl naphthalene, vinyl naphthalene derivatives, aliphatic alcohol esters or the like of α,β-ethylenic unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acrylamide, and derivatives thereof; and salts thereof. Natural resins such as rosin, shellac, and starch can also be preferably used. Those resins are alkali-soluble resins which are soluble in an aqueous solution containing a base. These resins may be used alone or as a mixture of two or more.

Examples of the surfactant usable as the dispersant include: an anionic surfactant such as a carboxylate, sulfonate, or phosphate; cationic surfactant; nonionic surfactant such as a polyoxyalkylene group; and amphoteric surfactant. These surfactants may be used alone or as a mixture of two or more.

Of the above dispersants, block copolymers are particularly preferred to carry out the present invention. A block copolymer has a hydrophobic block, and a hydrophilic block. Those having a well-balanced block size, which contribute to dispersion stability, are particularly advantageous in carrying out the present invention. The specific interaction between a dispersant and a water-dispersible coloring material for improving dispersion stability can be further intensified by introducing a functional group into the hydrophobic block to which the water-dispersible coloring material binds. The high dispersion stability is advantageous in improving the durability of the ink jet head of a bubble jet system in particular. The amount of the copolymer to be used depends on the structure, molecular weight, and other properties of the copolymer and on the other components of an ink composition. The weight average molecular weight of the copolymer selected to carry out the present invention is less than 30,000, preferably less than 20,000, more preferably within the range of 2,000 to 10,000.

Typical examples of the hydrophobic monomer which can be used for the block copolymer include, but are not limited to, the following monomers: methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxylethyl methacrylate (HEMA), hydroxypropyl methacrylate, 2-ethoxyethyl methacrylate, methacrylonitrile, 2-trimethyl siloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylayte, hydroxyethyl acrylate, hydroxypropyl acrylate, acrylonitrile, 2-trimethyl siloxyethyl acrylate, glycidyl acrylate, p-tolyl acrylate, and sorbyl acrylate. Preferred hydrophobic monomers are methyl methacrylate, butyl methacrylate, and 2-ethylhexyl methacrylate. As polymers made of those monomers, a homopolymer produced from any one monomer selected from methyl methacrylate, butyl methacrylate, and 2-ethylhexyl methacrylate, a copolymer of methyl methacrylate, butyl methacrylate, and 2-ethylhexyl methacrylate, and a copolymer of methyl methacrylate and butyl methacrylate are preferable.

Typical examples of the hydrophilic monomer which can be used for the block copolymer include, but are not limited to, the following monomers: methacrylic acid (MAA), acrylic acid, dimethylaminoethyl methacrylate (DMAEMA), diethylaminoethyl methacrylate, tert-butylaminoethyl methacrylate, dimethylaminoethyl acrylate, diethylaminoethyl acrylate, dimethylaminopropyl methacrylamide, methacrylamide, acrylamide, and dimethylacrylamide. As polymers made of those monomers, a homopolymer produced from any one monomer selected from methacrylic acid, acrylic acid, and dimethylaminoethyl methacrylate, and a copolymer of methacrylic acid, acrylic acid, and dimethylaminoethyl methacrylate are preferable.

A polymer containing an acid is directly produced, or produced from a blocked monomer having a blocking group to be removed after polymerization. Examples of the blocked monomer to generate acrylic acid or methacrylic acid after removal of the blocking group include trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

The amount of this block copolymer dispersant is preferably 20 parts by mass or more, more preferably 50 parts by mass or more based on 100 parts by mass of the pigment. The total amount of the dispersants based on 100 parts by mass of the ink is preferably 0.1 to 25 parts by mass, more preferably 0.5 to 5 parts by mass. By setting the total amount of the dispersant in this range, a desired ink viscosity can be maintained and excellent dispersion stability can be retained.

Further, in order to improve ink ejection properties, a nonionic surfactant may be added to the ink of the present invention. Preferred examples of the nonionic surfactant include polyoxyethylene alkyl ethers, polyoxyethylene alkylphenyl ethers, polyoxyethylene fatty acid esters, sorbitan fatty acid esters, polyoxyethylene sorbitan fatty acid esters, and ethylene oxide adducts of acetylene glycol. Those nonionic surfactants each have an HLB of preferably 10 or more, more preferably 12 or more, still more preferably 15 or more. The amount of the surfactant to be used is preferably 0.3 parts by mass or more, more preferably 0.5 parts by mass or more, still more preferably 0.8 parts by mass or more based on 100 parts by mass of the ink in order to sufficiently obtain the effect of ink ejection continuation. When the amount of the surfactant to be used is too large, the viscosity of the ink may become too high. Therefore, the amount of the surfactant to be used is preferably 3 parts by mass or less, more preferably 2.5 parts by mass or less, still more preferably 2.0 parts by mass or less based on 100 parts by mass based on 100 parts by mass of the ink.

Next explained is the hardly water-soluble dye having no azo bond (non azo dye) used in the present invention. Any such a dye may be used as long as the dye fulfills performance aimed at by the present invention. Those dyes may be used alone or in combination of two or more.

Examples of the non azo dye include direct dyes and acid dyes. Preferable examples of the direct dye include: C.I. Direct Black 62 and 102; C.I. Direct Yellow 11, 87, 105, 106, and 130; C.I. Direct Orange 39; and C.I. Direct Blue 86, 106, 108, 189, and 199.

Preferable examples of the acid dye include: C.I. Acid Black 2; C.I. Acid Yellow 7 and 73; C.I. Acid Red 50, 51, 52, 82, 92, 94, and 289; Acid Violet 15 and 17; C.I. Acid Blue 1, 7, 9, 22, 23, 25, 40, 41, 43, 62, 78, 83, 90, 93, and 103; and Acid Green 3, 9, 16, 25, and 27.

Among these, direct dyes are especially preferable because of its high film forming ability on the surface of the heater and water resistance of the recorded image, and a dye having a sulfone group and a dimer structure is more preferred.

The solubility of the hardly water-soluble non-azo dye of the present invention in water is preferably 3% by mass or less. This is probably because the dye having low solubility in water tends to precipitate and form a thin film on the surface of the heater as the water content of the ink decreases owing to the heat from the heater.

When the above hardly water-soluble dye is used, a dye having a color close to the color of the water-dispersible coloring material in the ink is preferably used as the hardly water-soluble dye. A dye having a different color may be used as long as it does not affect the color tone. The content of the hardly water-soluble dye having no azo group in the ink of the present invention is made double or more the content of the water-dispersible coloring material (based on mass) to effectively prevent the kogation of the ink jet head. In view of ink ejection properties, the content of the hardly water-soluble non-azo dye in the ink of the present invention is preferably 10 times or less, more preferably 5 times or less the content of the water-dispersible coloring material.

To impart desired properties such as optical density, color tone, and water resistance to a printed product, a conventionally known water-soluble dye such as a water-soluble anionic dye, direct dye, acidic dye, or reactive dye may be used in addition to the pigment and organic coloring material which have been described above.

When the hardly water-soluble organic coloring material having no azo group is a fluorescent dye, the ink of the present invention becomes a fluorescent ink. In order to obtain a more preferred fluorescent ink, it is preferred to use a first fluorescent coloring material being a fluorescent, hardly water-soluble non-azo dye and a second fluorescent coloring material in combination. Further, it is preferred that the second fluorescent coloring material emits a fluorescence of a predetermined emission wavelength to be used for measurement or judgment on excitation at a predetermined excitation wavelength; and the first fluorescent coloring material also emits a fluorescence with the excitation wavelength, where the excitation spectrum of the second coloring material has a peak wavelength range next to the predetermined excitation wavelength, and an emission fluorescence spectrum of the first coloring material has an emission wavelength region substantially including at least that peak wavelength range.

Specifically, a combination of a compound represented by the following formula (A) as the first fluorescent dye and Acid Red 52 as the second fluorescent dye is particularly preferred.

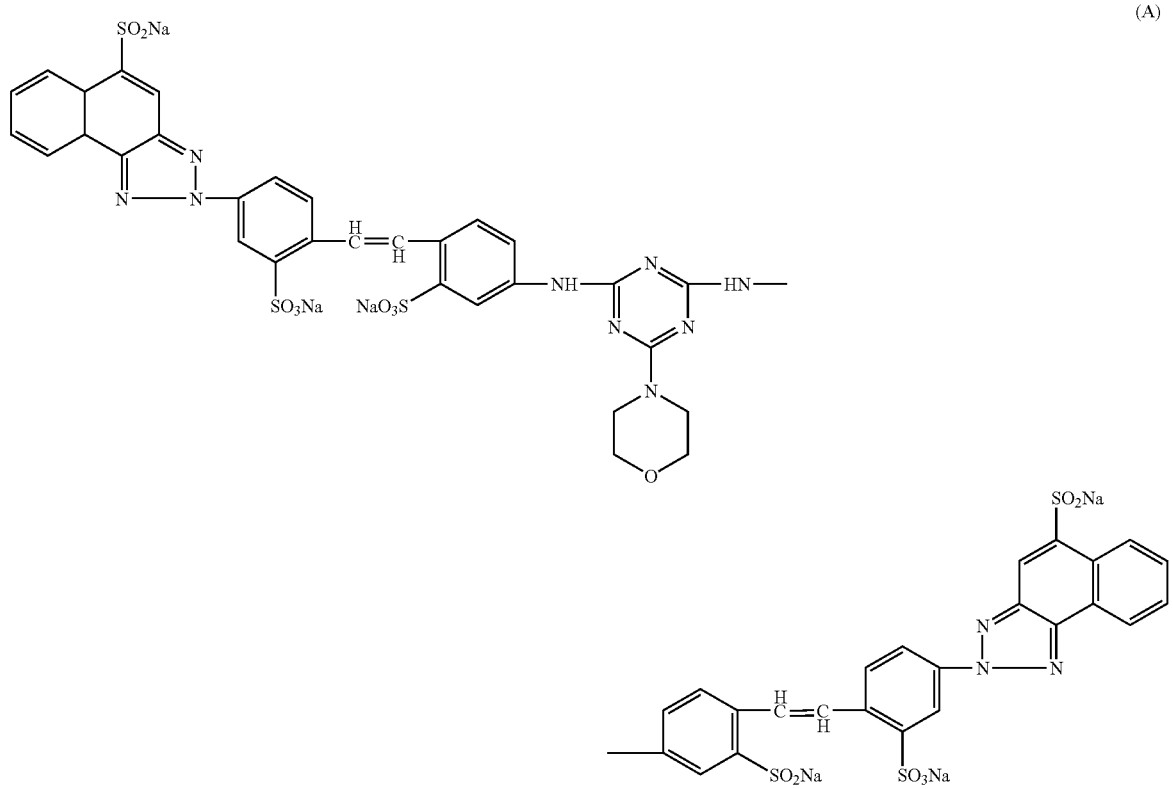

(A)

Since the compound (A) has dimer fluorescent luminophores in its structure, the compound (A) has an association prevention function and the addition amount of the compound (A) can be increased. As the fluorescent luminophores each have a relatively flat structure, the entire molecule of the compound (A) becomes flat, whereby the molecules tend to deposit with spaces therebetween. Further, the compound (A) is a direct dye, which has sulfone groups and is hardly soluble in water (solubility is less than 2% by mass to 98% by mass of pure water), and the compound (A) is freely soluble in an organic solvent. The solvent used in the ink is preferably an organic solvent which sufficiently dissolves the compound (A). Further, the ink preferably contains a surfactant as a solvent. The compound (A) homogenized with the solvent can fully exhibit the effect.

Next explained is the aqueous liquid medium of the ink of the present invention. The aqueous liquid medium used in the present invention preferably includes water as the main component and the content of water in the ink is preferably 10 to 95% by mass, more preferably 25 to 93% by mass, much more preferably 40 to 90% by mass based on the total mass of the ink. Water used in the present invention is preferably ion exchange water.

Water may be used alone as the aqueous liquid medium in the ink of the present invention, but a water-soluble organic solvent is used in combination with water to make the effect of the present invention more conspicuous.

Specific examples of the water-soluble organic solvent that can be used in the present invention include: alkyl alcohols each having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides such as dimethylformamide and dimethylacetamide; ketones and ketone alcohols such as acetone and diacetone alcohol; ethers such as tetrahydrofuran and dioxane; addition polymers of oxyethylene or oxypropylene, such as diethylene glycol, triethylene glycol, tetraethylene glycol, dipropylene glycol, tripropylene glycol, polyethylene glycol, and polypropylene glycol; alkylene glycols with alkylene groups each having 2 to 6 carbon atoms such as ethylene glycol, propylene glycol, trimethylene glycol, butylene glycol, pentanediol, and hexylene glycol; triols such as glycerin, trimethylolethane, trimethylolpropane, and 1,2,6-hexanetriol; thiodiglycol; bishydroxyethyl sulfone; lower alkyl glycol ethers such as ethylene glycol monomethyl (monoethyl or monobutyl) ether, diethylene glycol monomethyl (monoethyl or monobutyl) ether, and triethylene glycol monomethyl (monoethyl or monobutyl) ether; lower dialkyl glycol ethers such as triethylene glycol dimethyl (or diethyl) ether and tetraethylene glycol dimethyl (or diethyl) ether; alkanolamines such as monoethanolamine, diethanolamine, and triethanolamine; sulfolane; N-methyl-2-pyrrolidone; 2-pyrrolidone; and 1,3-dimethyl-2-imidazolidinone. The water-soluble organic solvents described above can be used independently or as a mixture.

In general, the content of the water-soluble organic solvent in the ink is preferably 50 parts by mass or less, more preferably 5 to 40 parts by mass, much more preferably 10 to 30 parts by mass based on 100 parts by mass of the ink. Among those solvents, ethylene glycol, diethylene glycol, triethylene glycol, 2-pyrrolidone, glycerin, and 1,2,6-hexanetriol are preferred.

Urea, ethylene urea, or trimethylolpropane is preferably incorporated in the ink of the present invention as a humectant similar to a solvent. Of those, ethylene urea and trimethylolpropane are particularly suitable for the present invention. The amount of the humectant is preferably 1 part by mass or more and 20 parts by mass or less based on 100 parts by mass of the ink.

In the present invention, a surfactant is preferably incorporated in the ink. The reason is considered as follows. When a bubble is generated in the ink in the head, the surfactant is present at the interface between the bubble and the ink, so that the hardly water-soluble dye can align on the interface more easily and a film is more easily formed on the heater when the bubble disappears than in a system containing no surfactant.

The surfactant may be nonionic, anionic, or cationic but preferably nonionic or anionic, more preferably nonionic because the hardly water-soluble dye is anionic. Preferable nonionic surfactants are those not phase separate in an aqueous solution state. If the content of the nonionic surfactant in the ink is set to a level at which the emulsion state is maintained in the aqueous solution or lower levels, ink stability will not decrease, advantageously.

Further, in the present invention, a surfactant having an HLB of 6 to 13 is preferably used from the viewpoint of water solubility.

Among the nonionic surfactants which satisfy the above requirements, particularly preferred are compounds represented by the following general formula (I) and compounds represented by the following formulas (II) to (VII) as the constituent component of the ink of the present invention. However, the present invention is not limited to those.

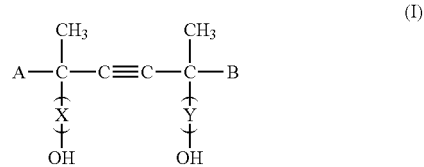

(I)

[in the above general formula (I), A and B are each independently $C_nH_{2n-n}$ (n is an integer of 1 to 10), and X and Y are ring opened ethylene oxide unit and/or ring opened propylene oxide unit.]

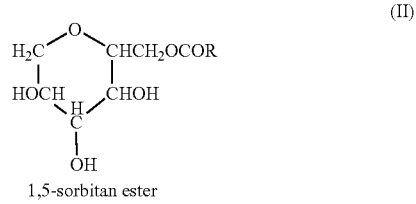

(II)

1,5-sorbitan ester

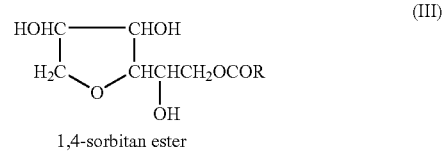

(III)

1,4-sorbitan ester

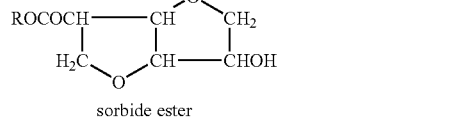

(IV)

sorbide ester

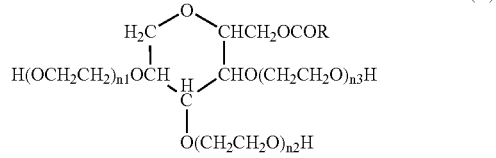

(V)

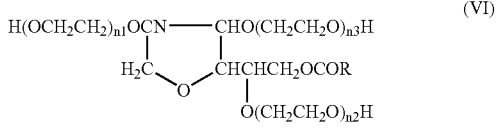

(VI)

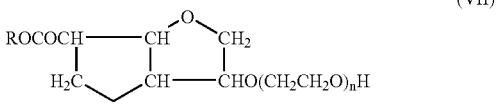

(VII)

(R: alkyl group of a fatty acid)

Among the nonionic surfactants represented by the above general formula (I), particularly preferred are compounds represented by the following general formula (VIII).

(VIII)

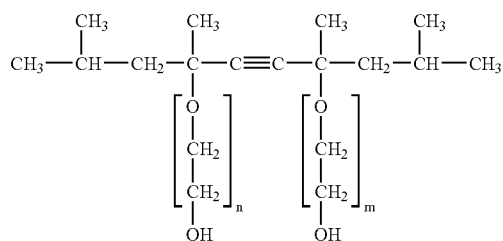

M and n are each an integer.

In addition to the above components, additives such as a defoaming agent, surface tension modifier, pH modifier, viscosity modifier, antiseptic, antioxidant, evaporation promoter, rust preventive, mildew-proofing agent, and chelating agent may be incorporated in the ink of the present invention as required to provide the ink with desired properties.

The viscosity of the ink of the present invention is preferably 0.7 to 12 cP at 25° C. Thus, when the viscosity of the ink is in the above range, the ink can be properly ejected in ink jet recording while penetrating into a recording material quickly, which is preferred from the viewpoint of fixability.

The surface tension of the ink used in the present invention is preferably adjusted to 20 to 60 dyne/cm at 25° C. When the surface tension is 20 dyne/cm or more, after an droplet is ejected in the ink jet recording, foam inclusion or wetting of the orifice face would not occur because force pulling back force the meniscus is strong or force pulling back the meniscus is strong when the meniscus projected. As a result, droplet distortion is prevented.

The ink of the present invention which is constituted as described above is particularly suitable for use in the bubble jet recording method in which thermal energy is given to the ink to form a bubble in the ink in order to eject an ink droplet.

Figure 2:
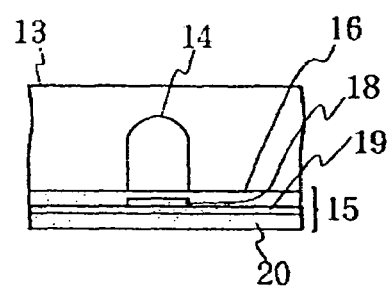
FIG. 2 is a transverse sectional view of an example of the head of an ink jet recording apparatus.

Next explained is an example of the ink jet recording apparatus of the present invention suitable for recording using the above ink of the present invention. An example of a configuration of a head which is the main element of the ink jet recording apparatus making use of thermal energy is shown in FIG. 1 and FIG. 2. FIG. 1 is a sectional view of a head 13 along the flow passage of the ink and FIG. 2 is a sectional view cut on a line 2—2 of FIG. 1.

The head 13 is formed by attaching glass, ceramic, silicon, or plastic etc. in which at least one ink flow path 14 is provided, to a heat generating element 15. The heat-generating element 15 is composed of a protective film 16 made of silicon oxide, silicone nitride, silicon carbide or the like, aluminum electrodes 17-1 and 17-2 made of aluminum, aluminum-copper alloy or the like, a heat-generating resistance layer 18 made of a high melting point material such as HfB2, N and TaAl, a heat-accumulating layer 19 made of thermal silicon oxide and aluminum oxide etc., and a substrate 20 made of silicon, aluminum or aluminum nitride etc. which is excellent in heat releasing.

Figure 3:
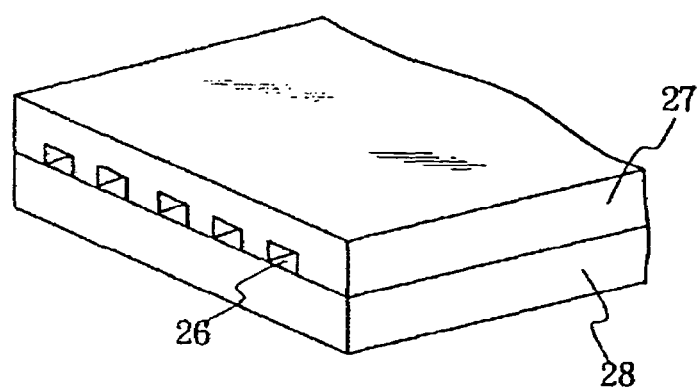
FIG. 3 is a perspective view of an appearance of a head having several nozzles like that shown in FIG. 1.

Upon application of the electric signal to the electrodes 17-1 and 17-2 as a pulse, heat is rapidly generated at the region shown by "n" to form a bubble in the ink 21 in contact with this region. The meniscus 23 of the ink is ejected by the pressure of the bubble thus produced, and is ejected from the orifice 22 to a recording medium 25 in the form of an ink droplet 24 to attach onto the recording medium 25. FIG. 3 schematically illustrates a recording head having an array of nozzles similar to that is shown in FIG. 1. This head is prepared by bonding a glass plate 27 having a number of flow path 26 to a heat generating head 28 similar to that is shown in FIG. 1.

Figure 4:
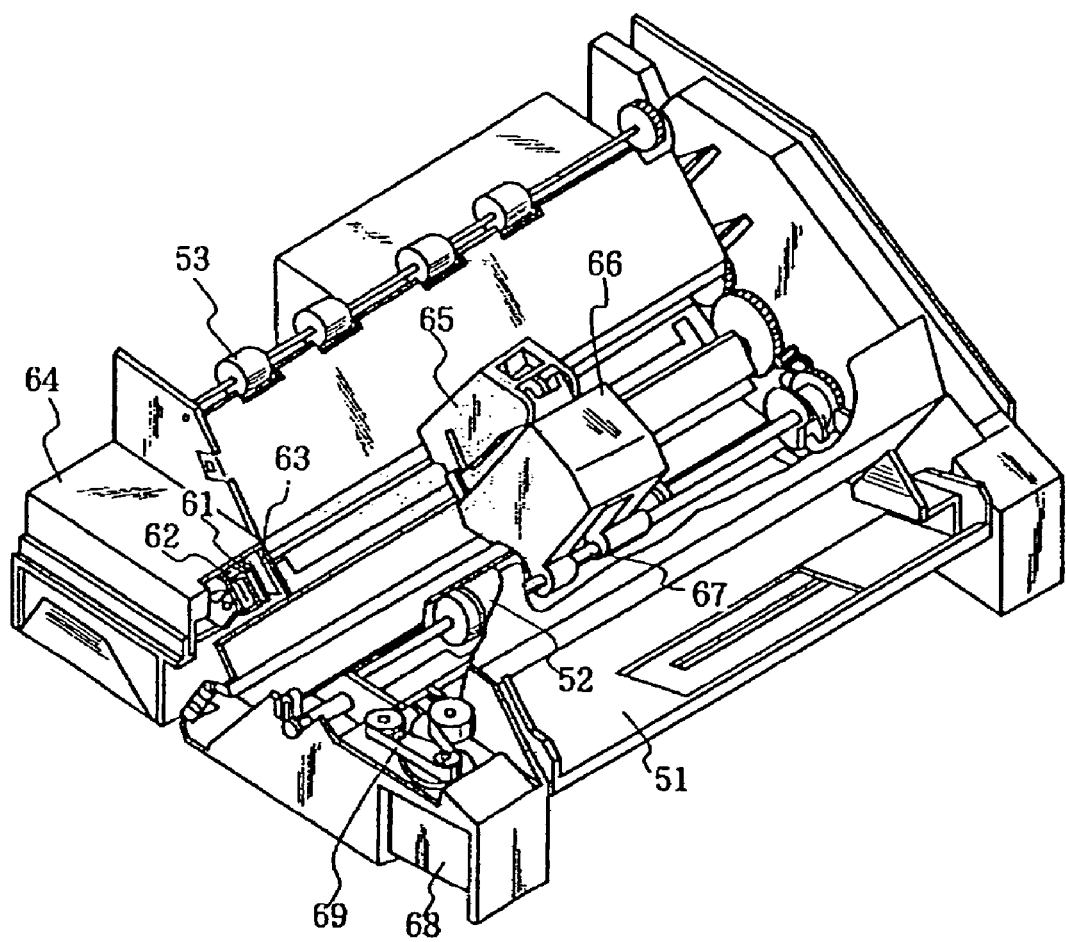
FIG. 4 is a schematic perspective view of an example of an ink jet recording apparatus.

FIG. 4 illustrates an example of an ink-jet recording apparatus in which such a head as described above is incorporated. In FIG. 4, the blade 61 is a wiping member, one end of which is a fixed end held by a blade-holding member to cantilever. The blade 61 is provided at a position adjacent to a region in which a recording head 65 operates, and in this aspect, is held in such a form that it protrudes into the path of the recording head 65. Reference numeral 62 designates a cap for an ejection opening of the recording head 65, and the cap is arranged in a home position adjacent to the blade 61, moves in the direction perpendicular to the moving direction of the recording head 65, and caps the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery part 64, and the blade 61 and the ink-absorber 63 serve to remove moisture and dust on the ink-ejecting opening.

Reference numeral 65 designates a recording head. The head contains an energy generating means for ink ejection and performs recording by ejecting ink towards a recording medium opposite to the ink-ejecting opening. Numeral 66 designates a carriage for carrying the recording head 65 to move it. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 designates a recording medium feeding part for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery part 64 recedes from the moving path of the recording head, but the blade 61 is projecting in the moving path. As a result, the ink ejecting opening of the recording head 65 is wiped.

When the cap 62 comes into contact with the ejection opening face of the recording head 65 to cap it, the cap 62 moves so as to protrude into the path of motion of the recording head 65.

When the recording head 65 is moved from its home position to the position at which recording is started, the cap 62 and the blade 61 are at the same positions as the wiping position as described above. As a result, the ejection opening of the recording head 65 is also wiped at the time of this movement. The above movement of the recording head 65 to its home position is made not only when the recording is completed or for ejection recovery, but also when the recording head 65 is moving in the recording region for recording, that is, it moves to the home position adjacent to the recording region at given intervals during recording, so as to wipe the ejection opening face with this movement.

Figure 5:
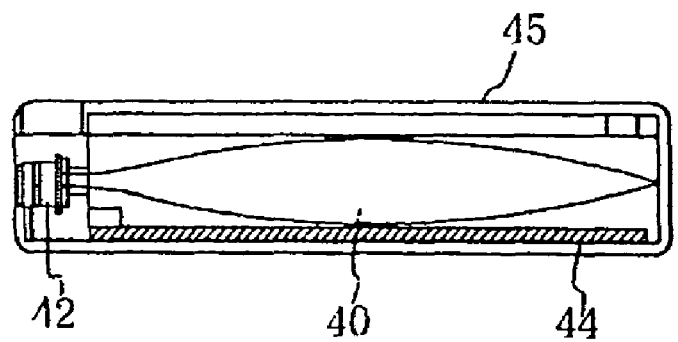
FIG. 5 is a longitudinal sectional view of an example of an ink cartridge.

FIG. 5 shows one example of an ink cartridge for storing ink for feeding ink to the recording head through an ink feeding member such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designate an ink absorber for receiving waste ink. For the ink storage portion, its surface in contact with ink is preferably made of polyolefin, particularly polyethylene.

Figure 6:
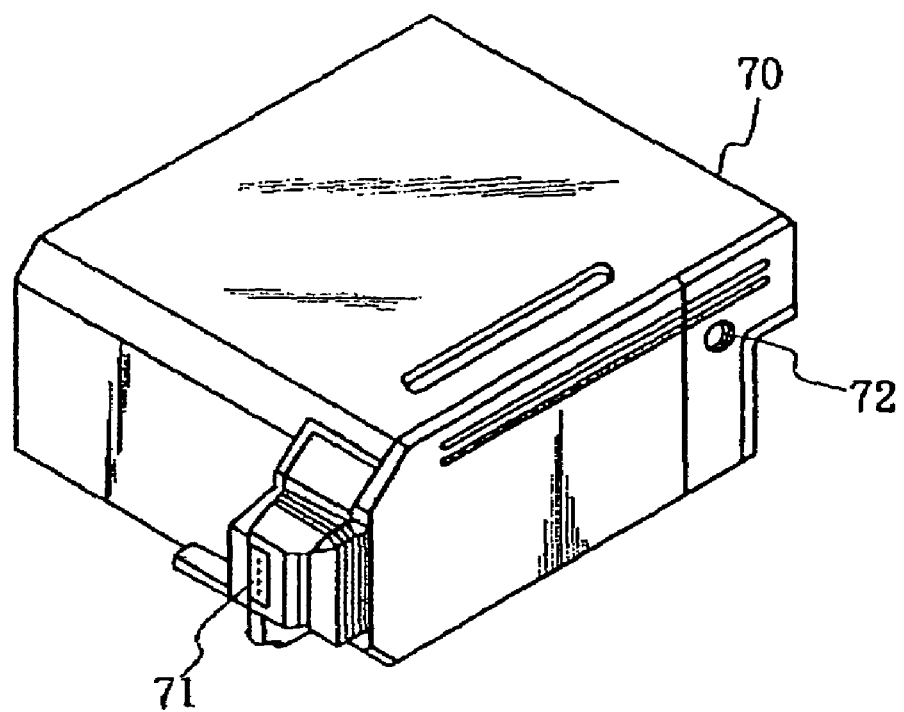
FIG. 6 is a perspective view of an example of a recording unit.

The ink jet recording apparatus of the present invention is not limited to an apparatus having a head and an ink cartridge as separate units as described above. An apparatus having a head and an ink cartridge as an integrated unit as shown in FIG. 6 is also a preferable form. In FIG. 6, reference numeral 70 denotes a recording unit including an ink storage portion for storing an ink, for example, an ink absorber. The ink in the ink absorber is ejected as droplets from a head portion 71 having a plurality of orifices. The material of the ink absorber is preferably polyurethane. The ink storage portion may be an ink bag including a spring or the like therein instead of an ink absorber. Reference numeral 72 denotes an air communication port for communicating the inside of the cartridge to the atmosphere. This recording unit 70 is used in place of the recording head 65 shown in FIG. 4 and can be detached from the carriage 66.

The ink of the present invention having the above constitution can be yellow, magenta, cyan, red, green, blue, or black ink by suitably selecting a colorant. Those inks may be used alone for image recording. An ink set which can be suitably used for color image formation can be prepared by combining two or more different color inks. An ink set which can be advantageously used for the formation of a high-gradation image can be provided by combining two or more inks containing different colorants having the same color or by combining two or more inks having the same color and different densities.

EXAMPLES

The following examples and comparative examples are given to further illustrate the present invention. "%" in the following description is based on mass unless otherwise stated.

(1) Preparation of Dispersion of Water-dispersible Coloring Material

An AB type block polymer having an acid value of 250 and a number average molecular weight of 2,000 was obtained from benzyl acrylate and methacrylic acid as raw materials in accordance with a commonly used method. Subsequently, the block polymer was neutralized with an aqueous solution of potassium hydroxide, and was diluted with ion exchanged water to prepare a 50% homogeneous aqueous polymer solution.

120 g of the above aqueous polymer solution, 100 g of C.I. Pigment Red 122 as a water-dispersible coloring material, and 280 g of ion exchanged water were mixed together and stirred for 0.5 hours mechanically. This mixture was treated by making it pass through an interactive chamber of a microfluidizer under a liquid pressure of about 10,000 psi (about 700 kg/cm$^2$) five times.

Further, the thus obtained dispersion was centrifuged (12,000 rpm, 20 minutes) to remove non-dispersed products containing coarse particles. Thus prepared was a magenta pigment dispersion of larger particle diameter. Apart from this, the above mixture was let pass through the microfluidizer chamber 10 times in the same manner as described above to further reduce the particle size. The obtained dispersion was centrifuged (12,000 rpm, 20 minutes) to remove non-dispersed products including coarse particles in order to prepare a magenta pigment dispersion of smaller particle diameter. Those two different pigment dispersions were mixed together to prepare a magenta pigment dispersion to be used in Examples. The finally obtained magenta pigment dispersion had a pigment concentration of 10.0% and a dispersant concentration of 7.0%.

(2) Preparation of Ink

Components shown in each of Examples 1 to 3 and Comparative Examples 1 and 2 were added to the above pigment dispersion to a predetermined concentration, and the whole was fully mixed and stirred. Then, each of the resulting mixtures was filtered with a microfilter having a pore size of 3 μm (manufactured by Fuji Film Co., Ltd.) under pressure to prepare an ink.

(Example 1)

| | |
|---|---|
| Magenta pigment dispersion | 10 parts by mass |
| Compound (A) | 2 parts by mass |
| Glycerin | 10 parts by mass |
| Diethylene glycol | 5 parts by mass |
| Acetylenol E100 (EO adduct of acetylene glycol manufactured by Kawaken Fine Chemical Co., Ltd.) | 1 part by mass |
| BC-30TX (polyoxyethylene cetyl ether EO No. 30 manufactured by Nippon Surfactant Kogyo Co., Ltd.) | 1 part by mass |
| Water | 71 parts by mass |

(Example 2)

| | |
|---|---|
| Magenta pigment dispersion | 10 parts by mass |
| Compound (A) | 2 parts by mass |
| C.I. Acid Red 52 | 0.2 parts by mass |
| Glycerin | 5 parts by mass |
| Ethylene urea | 10 parts by mass |
| Acetylenol E100 (EO adduct of acetylene glycol manufactured by Kawaken Fine Chemical Co., Ltd.) | 1 part by mass |
| BC-30TX (polyoxyethylene cetyl ether EO No. 30 manufactured by Nippon Surfactant Kogyo Co., Ltd.) | 1 part by mass |
| Water | 70.8 parts by mass |

(Example 3)

| | |
|---|---|
| Magenta pigment dispersion | 6 parts by mass |
| Compound (A) | 1 part by mass |
| Glycerin | 10 parts by mass |
| Diethylene glycol | 5 parts by mass |
| Acetylenol E100 (EO adduct of acetylene glycol manufactured by Kawaken Fine Chemical Co., Ltd.) | 1 part by mass |
| BC-30TX (polyoxyethylene cetyl ether EO No. 30 manufactured by Nippon Surfactant Kogyo Co., Ltd.) | 1 part by mass |
| Water | 76 parts by mass |

(Comparative Example 1)

| | |
|---|---|
| Magenta pigment dispersion | 10 parts by mass |
| Glycerin | 10 parts by mass |
| Diethylene glycol | 5 parts by mass |
| Acetylenol E100 (EO adduct of acetylene glycol manufactured by Kawaken Fine Chemical Co., Ltd.) | 1 part by mass |
| Water | 74 parts by mass |

(Comparative Example 2)

| | |
|---|---|
| Magenta pigment dispersion | 10 parts by mass |
| C.I. Acid Red 52 | 0.4 parts by mass |
| C.I. Acid Yellow 73 | 0.4 parts by mass |
| 2-pyrrolidone | 5 parts by mass |
| Triethylene glycol | 8 parts by mass |

-continued

| | |
|---|---|
| Acetylenol E100 (EO adduct of acetylene glycol manufactured by Kawaken Fine Chemical Co., Ltd.) | 1 part by mass |
| BC-30TX (polyoxyethylene cetyl ether EO No. 30 manufactured by Nippon Surfactant Kogyo Co., Ltd.) | 1 part by mass |
| Water | 76.2 parts by mass |

(Evaluation)

(1) Ejection stability: Differences in ink ejection speed were judged under the same conditions as conditions for driving a head for printing with a printer using the CANVAS ink jet recording apparatus having an on-demand multi-recording head for ejecting ink by applying thermal energy based on a recording signal to the ink and a black print head for the BJS600 printer manufactured by Canon. The results are shown in Table 1.

A: Differences in ink ejection speed are smaller than 2 m/s (no influence on printed image)

B: Differences in ink ejection speed are 2 m/s or more and less than 4 m/s (printing disorder occurs in printed image in some cases).

C: Differences in ink ejection speed are 4 m/s or more (image disorder occurs in every printed image).

(2) Head durability: The inks of Examples were continuously ejected by driving 10 black ink nozzles with $7 \times 10^8$ pulses in the BJS600 (manufactured by Canon) to regularly evaluate the condition of ejection and the presence or absence of a deposit on the surface of the heater. The results are shown in Table 1 below.

A: The number of nozzles having no problem is 10 (all the nozzles) and no deposition on the surface of the heater is seen (no influence on printed image).

B: The number of nozzles having no problem is 7 to 9 (printed image is affected).

C: The number of nozzles having no problem is 6 or less (printed image cannot be identified or read).

TABLE 1

| | Ejection stability | Head durability (number of pulses) | | | |
|---|---|---|---|---|---|
| | | $2 \times 10^8$ | $3 \times 10^8$ | $5 \times 10^8$ | $7 \times 10^8$ |
| Example 1 | A | A | A | A | A |
| Example 2 | A | A | A | A | A |
| Example 3 | A | A | A | A | B |
| Comparative Example 1 | C | B | C | C | C |
| Comparative Example 2 | B | A | B | C | C |

It is clear from the above results and the conditions of Examples including the physical properties and amounts of the compounds used that the mechanism of the present invention is achieved. It is understood from comparison between Examples 1 and 2 in each of which the content of the hardly water-soluble dye was twice or more the content of the water-dispersible coloring material and Example 3 in which the content of the hardly water-soluble dye was about 1.7 times the content of the water-dispersible coloring material that Examples 1 and 2 are superior in durability.

In the field of the ink jet recording apparatus, in general, when an excellent image is obtained after $1 \times 10^8$ pulses, durability is estimated extremely high, and this is a standard in practical recording apparatuses. It is understood from this and the above table that the present invention provides extraordinarily excellent durability.

As described above, according to the present invention, there are provided an ink for ink jet recording having high durability which could not be attained in the prior art, particularly an ink for ink jet recording suitable for bubble jet recording, and an ink jet recording method. Since the dye is hardly water-soluble, the obtained image has excellent water resistance as well.

What is claimed is:

1. An ink for ink jet recording, the ink jet recording being carried out by ejecting the ink by applying thermal energy to the ink, the ink comprising:
    an aqueous liquid medium;
    a water-dispersible coloring material; and
    a hardly water-soluble dye having no azo group,
    wherein the content of the water-dispersible coloring material is 0.5 to 10 parts by mass based on 100 parts by mass of the ink,
    wherein the content of the hardly water-soluble dye having no azo group is double or more the content of the water-dispersible coloring material based on mass, and
    wherein the hardly water-soluble dye is represented by the following formula (A):

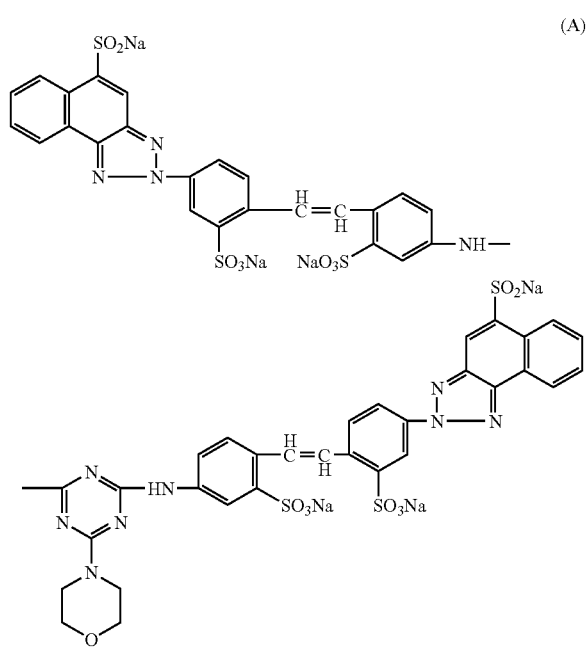

2. The ink for ink jet recording according to claim 1, wherein the water-dispersible coloring material is a pigment.

3. The ink for ink jet recording according to claim 2, wherein the pigment is a dispersant dispersible pigment.

4. The ink for ink jet recording according to claim 1, further comprising a surfactant.

5. The ink for ink jet recording according to claim 4, wherein the surfactant is at least one of a nonionic surfactant and an anionic surfactant.

6. The ink for ink jet recording according to claim 4, wherein the surfactant has an HLB of 6 to 13.

7. An ink jet recording method comprising the steps of:
ejecting an ink from an ejection port by thermal energy, the ink being the ink for ink jet recording according to claim 1; and
attaching the ink to a recording medium to carry out recording.

8. The ink jet recording method according to claim 7, wherein the content of the hardly water-soluble dye is between two and 10 times the content of the water-dispersible coloring material based on mass.

9. The ink jet recording method according to claim 7, wherein the water-dispersible coloring material is a pigment.

10. The ink jet recording method according to claim 9, wherein the pigment is a dispersant dispersible pigment.

11. The ink for ink jet recording according to claim 1, wherein the content of the hardly water-soluble dye is between two and 10 times the content of the water-dispersible coloring material based on mass.

12. An ink jet recording apparatus comprising a recording head ejecting the ink according to claim 1 by applying thermal energy to the ink.

13. The ink jet recording apparatus according to claim 12, wherein the content of the hardly water-soluble dye is between two and 10 times the content of the water-dispersible coloring material based on mass.

14. The ink jet recording apparatus according to claim 12, wherein the water-dispersible coloring material is a pigment.

15. The ink jet recording apparatus according to claim 14, wherein the pigment is a dispersant dispersible pigment.

* * * * *

UNITED STATES PATENT AND TRADEMARK OFFICE
CERTIFICATE OF CORRECTION

PATENT NO. : 7,125,111 B2 Page 1 of 1
APPLICATION NO. : 10/968986
DATED : October 24, 2006
INVENTOR(S) : Masako Udagawa et al.

It is certified that error appears in the above-identified patent and that said Letters Patent is hereby corrected as shown below:

COLUMN 5:
Line 45, "acrylayte," should read --acrylate,--.

COLUMN 10:
Line 19, "$C_nH_{2n-n}$ should read --$C_nH_{2n-1}$--.
Line 53, "CN" should read --CH--.

COLUMN 11:
Line 29, "an" should read --a--.
Line 49, "plastic etc." should read --plastic, etc.,--.
Line 58, "aluminum oxide" should read --aluminum oxide,--.
Line 59, "nitride" should read --nitride,--.
Line 60, "etc." should read --etc.,--.

COLUMN 12:
Line 2, "is shown" should read --shown--.
Line 4, "path" should read --paths--.

COLUMN 13:
Line 6, "designate" should read --designates--.

Signed and Sealed this

Eighteenth Day of March, 2008

JON W. DUDAS
*Director of the United States Patent and Trademark Office*